(12) United States Patent
Bouamor et al.

(10) Patent No.: US 10,997,374 B2
(45) Date of Patent: May 4, 2021

(54) GENERATION OF NATURAL LANGUAGE TEXT FROM STRUCTURED DATA USING A FUSION MODEL

(71) Applicant: FORTIA FINANCIAL SOLUTIONS, Paris (FR)

(72) Inventors: Houda Bouamor, Paris (FR); Sira Ferradans, Paris (FR); Guillaume Hubert, Paris (FR); Abderrahim Ait-Azzi, Paris (FR)

(73) Assignee: FORTIA FINANCIAL SOLUTIONS, Paris (FR)

( * ) Notice: Subject to any disclaimer, the term of this patent is extended or adjusted under 35 U.S.C. 154(b) by 234 days.

(21) Appl. No.: 16/361,300

(22) Filed: Mar. 22, 2019

(65) Prior Publication Data
US 2020/0302023 A1    Sep. 24, 2020

(51) Int. Cl.
| | | |
|---|---|---|
| *G06F 40/177* | (2020.01) | |
| *G06F 40/56* | (2020.01) | |
| *G06N 3/08* | (2006.01) | |
| *G06F 40/211* | (2020.01) | |
| *G06F 40/242* | (2020.01) | |
| *G06F 40/58* | (2020.01) | |
| *G06F 40/40* | (2020.01) | |
| *H04N 21/8405* | (2011.01) | |

(52) U.S. Cl.
CPC ............ *G06F 40/56* (2020.01); *G06F 40/211* (2020.01); *G06F 40/242* (2020.01); *G06N 3/08* (2013.01); *G06F 40/177* (2020.01); *G06F 40/40* (2020.01); *G06F 40/58* (2020.01); *H04N 21/8405* (2013.01)

(58) Field of Classification Search
CPC ..... H04N 21/8405; G06F 40/58; G06F 40/40; G06F 40/177
See application file for complete search history.

(56) References Cited

U.S. PATENT DOCUMENTS 9,286,290 B2 * 3/2016 Allen .................... G06F 40/205
9,807,473 B2 * 10/2017 Mei ....................... G06N 3/0445
(Continued)

FOREIGN PATENT DOCUMENTS

CN        106980683 A  *  7/2017

OTHER PUBLICATIONS

Wiseman, et al., "Learning Neural Templates for Text Generation," Sep. 2019. (Year: 2019).*

(Continued)

*Primary Examiner* — Feng-Tzer Tzeng
(74) *Attorney, Agent, or Firm* — Yasser Mourtada; Robert Facey; William Salinger

(57) ABSTRACT

Generating natural language text from structured data using a fusion model is disclosed. Based on an input dictionary, a first sequence of vectors is generated by a first encoder and a second sequence of vectors is generated by a second encoder. The first and second sequences of vectors are provided to an attention function which generates a modified sequence of vectors. A decoder decodes the modified sequence of vectors to generate a plurality of ordered sequences corresponding to a target natural language sentence. A predetermined number of candidate sentences are determined based on the plurality of ordered sequences and are ranked to select a sentence as the target natural language sentence.

20 Claims, 5 Drawing Sheets

(56) References Cited

U.S. PATENT DOCUMENTS

| | | | |
|---|---|---|---|
| 9,965,705 B2* | 5/2018 | Chen | G06N 5/04 |
| 2017/0323203 A1* | 11/2017 | Matusov | G06F 16/30 |
| 2017/0323636 A1* | 11/2017 | Xiao | G06F 40/289 |
| 2018/0329883 A1* | 11/2018 | Leidner | G06F 16/2237 |
| 2020/0356729 A1* | 11/2020 | Duan | G06F 40/177 |

OTHER PUBLICATIONS

Bahdanau, D. et al., "Neural Machine Translation by Jointly Learning to Align and Translate", conference paper at ICLR 2015.

Graves, A. et al., "Speech Recognition with Deep Recurrent Neural Networks", arXiv:1303.5778v1, Mar. 22, 2013.

Hochreiter, S. et al., "Long Short-term Memory", Neural Computation 9(8):1735-1780, 1997.

Chen, D.L. et al., "Learning to Sportscast: A Test of Grounded Language Acquisition", Proceedings of the 25th International Conference on Machine Learning, Helsinki, Finland, 2018.

Graves, A. et al., "Framewise Phoneme Classification with Bidirectional LSTM and other Neural Network Architectures", Neural Networks 18 (2005) 602-610.

Mansar, Y. et al., "Sentence Classification for Investment Rules Detection", Proceedings of the First Workshop on Economics and Natural Language Processing, pp. 44-48, Jul. 20, 2018, Melbourne, Australia.

Leppänen, L. et al., "Data-Driven News Generation for Automated Journalism", Proceedings of the 10th International Natural Language Generation Conference, pp. 188-197, Sep. 4-7, 2017, Santiago de Compostela, Spain.

Kiddon, C. et al., "Globally Coherent Text Generation with Neural Checklist Models", Proceedings of the 2016 Conference on Empirical Methods in Natural Language Processing, pp. 329-339, Nov. 1-5, 2016, Austin, Texas, United States.

Lin C., "Rouge: A Package for Automatic Evaluation of Summaries", In Proceedings of the Workshop on Text Summerization Branches Out, Jul. 2004.

Liu T. et al., "Table-to-text Generation by Structure-Aware Seq2seq Learning", The Thirty-Second AAAI Conference on Artificial Intelligence (AAAI-2018).

Sha L. et al., "Order-Planning Neutral Text Generation from Structured Data", The Thirty-Second AAAI Conference on Artificial Intelligence (AAAI-2018).

Gatt A. et al., "Survey of the State of the Art in Natural Language Generation: Core tasks, applications and evaluation", Journal of Artificial Intelligence Research 61 (2018) 65-170.

Wiseman S. et al., "Learning Neural Templates for Text Generation", Sep. 2018.

Novikova J. et al., "The E2E Dataset: New Challenges for End-to-End Generation", Jul. 2017.

Tang J. et al., "Context-aware Natural Language Generation with Recurrent Neural Networks", Nov. 2016.

Wu Y. et al., "Google's Neural Machine Translation System: Bridging the Gap between Human and Machine Translation", Oct. 2016.

Lebret R. et al., "Neural Text Generation from Structured Data with Application to the Biography Domain", Sep. 2016.

Liang P. et al., "Learning Semantic Correspondences with Less Supervision", Proceedings of the 47th Annual Meeting of the ACL and the 4th IJCNLP of the AFNPL, pp. 91-99, Aug. 2-7, 2009, Suntec, Singapore.

* cited by examiner

GENERATION OF NATURAL LANGUAGE TEXT FROM STRUCTURED DATA USING A FUSION MODEL

FIELD

The present disclosure relates to the field of data-to-text generation.

BACKGROUND

Data-to-text generation involves generating natural language text from non-linguistic structured abstract data (e.g., a table). Two major approaches are used conventionally: a template-based approach and a sequence-to-sequence with attention approach.

The template-based approach is based on generating sentence templates from a training data set. During inference, based on an input dictionary, one of the generated sentence templates is selected and a natural language sentence is generated by applying the input dictionary to the selected sentence template. The template-based approach suffers from various drawbacks. For example, the generated sentence may not be a fluent, grammatical sentence necessarily. Additionally, the approach is highly dependent on the use of a very large and diverse training data set and is therefore very laborious.

The sequence-to-sequence with attention approach trains a neural sequence to sequence model using a set of training input dictionaries and corresponding reference sentences. As such, the task is similar to a translation task where the goal is to generate a sequence of words from an input sequence. However, this approach suffers from a lack of user control and is computationally extensive.

SUMMARY

Embodiments of the present disclosure provide a method for generating natural language text from structured data using a fusion model. In an embodiment, the method comprises:

receiving an input dictionary including a plurality of field-value pairs;

generating, by a first encoder, a first sequence of vectors based on the input dictionary;

receiving a second sequence of vectors, generated by a second encoder based on the input dictionary;

generating, by a first attention function, a modified first sequence of vectors based on the first sequence of vectors and the second sequence of vectors;

decoding, by a first decoder, the modified first sequence of vectors based on a vocabulary to generate a first plurality of ordered sequences of index values and associated probabilities for each ordered sequence, each ordered sequence being a respective representation of a target natural language sentence;

selecting a first predetermined number of ordered sequences of index values based on the first plurality of ordered sequences, the first predetermined number of ordered sequences representing the most probable ordered sequences among the first plurality of ordered sequences;

generating a first predetermined number of candidate sentences, each corresponding to the target natural language sentence, respectively from the first predetermined number of ordered sequences; and selecting a sentence as the target natural language sentence, based on a ranking based at least on the first predetermined number of candidate sentences.

The fusion model may be based on an architecture that integrates a sentence generation component and a template generation component. The sentence generation component may provide a model trained to generate one or more sentences corresponding to a target natural language sentence (sentence generation or realization model). The template generation component may provide a model trained to generate one or more templates corresponding to the target natural language sentence (template generation or planning model).

In an embodiment, the first encoder, the first attention function, and the first decoder form part of the sentence generation component, and the second encoder forms part of the template generation component. As such, the first attention function of the sentence generation component is provided the encoded representation of the input dictionary (the second sequence of vectors) generated by the template generation component. The second sequence of vectors act as guiding weights for the first attention function and result in improved performance of the first attention function and, by consequence, the first decoder. In an embodiment, the second sequence of vectors includes hidden states of the second encoder.

In an embodiment, the input dictionary is a flattened input dictionary.

In an embodiment, the fusion model architecture may comprise one or more embedding layers that transform the input dictionary into an input sequence of vectors for the first/second encoder. As such, the method may further comprise:

mapping each value of the plurality of field-value pairs of the input dictionary into a corresponding index; and mapping the corresponding index of each value into a respective vector of an input sequence of vectors; and providing the input sequence of vectors to the first encoder to generate the first sequence of vectors.

The vocabulary may include words (e.g., all words) from training sentences (e.g., all training sentences) used to train the fusion model as well as a list of possible fields and corresponding possible values.

In an embodiment, the first encoder and the second encoder may be Bidirectional Long Short-Term Memory (Bi-LSTM) encoders.

In an embodiment, an ordered sequence of index values generated by the first decoder comprises a first index value in a first position of the ordered sequence and a second index value in a second position of the ordered sequence. The associated probabilities for the ordered sequence comprise a first probability associated with the first index value being in the first position and a second probability associated with the second index value being in the second position given that the first index value is in the first position.

In an embodiment, the sentence selected as the target natural language sentence maximizes a first number corresponding to the number of values in the candidate sentence that appear in the input dictionary and minimizes a second number corresponding to the number of values in the candidate sentence that do not appear in the input dictionary. As such, the ranking reflects how faithful a candidate sentence is to the input dictionary. In an embodiment, the ranking may be based on a ranking function based on an F-1 score.

In an embodiment, the fusion model, through the template generation component, may be used to generate sentence templates based on the input dictionary. The generation of sentence templates may be performed simultaneously with the generation of candidate sentences for the target natural language sentence. Alternatively, the fusion model may be used to generate sentence templates independent of the generation of candidate sentences.

In an embodiment, the template generation component comprises, in addition to the above-mentioned second encoder, a second attention function and a second decoder. In an embodiment, the method further comprises:

generating, by a second attention function, a modified second sequence of vectors based on the second sequence of vectors;

decoding, by a second decoder, the modified second sequence of vectors based on the vocabulary to generate a second plurality of ordered sequences of index values and associated probabilities for each ordered sequence, each ordered sequence being a respective representation of a target sentence template;

selecting a second predetermined number of ordered sequences of index values based on the second plurality of ordered sequences, the second predetermined number of ordered sequences representing the most probable ordered sequences among the second plurality of ordered sequences; and generating a predetermined number of candidate sentence templates, each corresponding to the target sentence template, respectively from the second predetermined number of ordered sequences.

In an embodiment, the first decoder and the second decoder may be Bi-LSTM decoders.

In an embodiment, the method may further comprise relexicalizing the predetermined number of candidate sentence templates using the input dictionary to generate a second predetermined number of candidate sentences, each corresponding to the target natural language sentence. This allows to generate additional candidate sentences from which the target natural language sentence can be selected. Specifically, in an embodiment, the method may further comprise:

ranking a set of sentences including the first predetermined number of candidate sentences and the second predetermined number of candidate sentences; and selecting the sentence as the target natural language sentence based on the ranking of the set of sentences.

To enable sentence generation and template generation with acceptable performance, the sentence generation component and the template generation component are trained before the fusion model is used for inference. In an embodiment, the method comprises:

training the template generation component; and
training the sentence generation component using the trained templated generation component.

In an embodiment, training the template generation component comprises:

delexicalizing a training input dictionary to generate a reference template; and training the template generation component using the training input dictionary and the reference template.

In an embodiment, training the sentence generation component comprising:

flattening a training input dictionary to generate a flattened input dictionary;

applying the flattened input dictionary and a corresponding reference sentence to the sentence generation component; and feeding hidden states generated by the second encoder based on the flattened input dictionary to the first attention function.

In another aspect, embodiments of the present disclosure provide a non-transitory computer readable medium having computer instructions stored thereon, the computer instructions when executed by a processor cause the processor to perform a method for generating natural language text from structured data using a fusion model according to any of the method embodiments described above.

In a further aspect, embodiments provide a computer system, comprising a processor and a memory storing computer instructions, the computer instructions when executed by the processor causes the processor to perform a method for generating natural language text from structured data using a fusion model according to any of the method embodiments described above.

BRIEF DESCRIPTION OF THE DRAWINGS

Further features and advantages of the present disclosure will become apparent from the following description of certain embodiments thereof, given by way of illustration only, not limitation, with reference to the accompanying drawings in which.

DETAILED DESCRIPTION OF EXAMPLE EMBODIMENTS

Embodiments of the present disclosure provide systems, methods, and computer program products for generating natural language text from structured data using a fusion model.

In an embodiment, the fusion model may be based on an architecture that integrates a sentence generation component and a template generation component. The sentence generation component may provide a model trained to generate one or more sentences corresponding to a target natural language sentence based on an input dictionary. The template generation component may provide a model trained to generate one or more templates corresponding to a target sentence template based on the input dictionary.

Before the fusion model can be used for inference, the fusion model is first trained. This includes providing the fusion model with training data (training input dictionaries similar to the input dictionaries that are expected to be applied to the fusion model during inference) and the correct answers that the fusion model should output based on the training data. The internal weights of the different components of the fusion model may be adapted based on the input data to result in a trained fusion model.

In embodiments, the fusion model may be trained to generate natural language sentences and/or sentence templates that correspond to specific fields (e.g., news, finance, sports, etc.). This is done by tailoring both the training data and the correct answers provided therewith to the desired specific field. In one embodiment, further described below, the fusion model may be adapted to generate natural language investment rules from structured data summarizing the contents of the rules.

In an embodiment, the training data and the input dictionaries are in the form of structured data that includes a plurality of field-value pairs (i.e., values corresponding to fields). The structured data may be flat or hierarchical (i.e., including fields and sub-fields).

Figure 1:
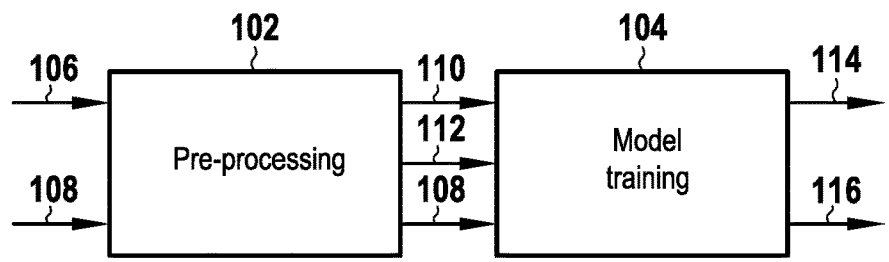
FIG. 1 illustrates training a fusion model according to an example embodiment.

FIG. 1 illustrates training a fusion model according to an example embodiment. As shown in FIG. 1, the training includes a pre-processing step 102 and a model training step 104.

During pre-processing step 102, input data including a training input dictionary 106 and a corresponding reference sentence 108 (i.e., a natural language sentence answer based on training input dictionary 106) are received. In an embodiment, training input dictionary 106 is in the form of $D=\{Field_i, Value_i\}_{i=1 \ldots N}$ (where N is the number of fields in the dictionary). Reference sentence 108 may be given by a sequence of words $S=\{w_j\}_{j=1 \ldots M}$ (where M is the length in words of the sentence) where every word $w_j$ of S belongs to a vocabulary V. In an embodiment, a full coverage constraint on S may be required such that every $Value_i$ (i=1 . . . N) of D appears in S.

Figure 3:
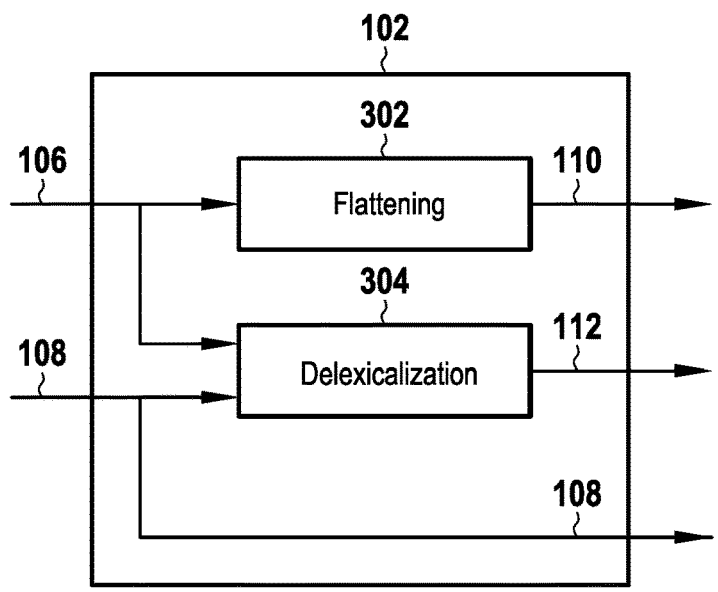
FIG. 3 illustrates pre-processing performed prior to training a fusion model according to an example embodiment.

As shown in more detail in FIG. 3, pre-processing step 102 may include a flattening step 302 and a delexicalization step 302. In flattening step 302, training input dictionary 106 is flattened to generate a flattened input dictionary 110. For example, if training input dictionary 106 is in the form of $D=\{Field_i, Value_i\}_{i=1 \ldots N}$ (where N is the number of fields in the dictionary), flattened input dictionary 110 may be of the form $I=Field_1, Value_1, Field_2, Value_2, \ldots, Field_N, Value_N$.

In delexicalization step 304, reference sentence 108 is delexicalized to generate a reference template 112. In an embodiment, this includes replacing each word of reference sentence 108 that corresponds to a Value (e.g., $Value_k$) of training input dictionary 106 with the Field corresponding to the Value (i.e., $Field_k$) in training input dictionary 106. For example, if reference sentence 108 is composed of the sequence of words $S=w_1, w_2, w_3, \ldots, w_{M-1}, w_M=w_1, Value_1, w_3, \ldots, Value_N, w_M$, then reference template 112 would be $T=w_1, Field_1, w_3, \ldots, Field_N, w_M$.

In model training step 104, flattened input dictionary 110, reference sentence 108, and reference template 112 are applied to the fusion model to generate an output sentence 114 and an output template 116.

Figure 2:
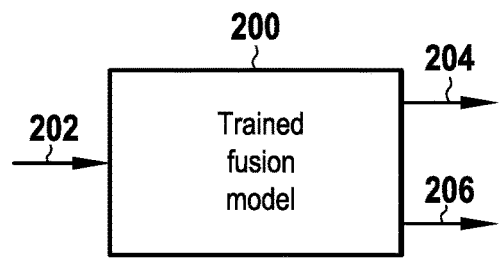
FIG. 2 illustrates inferencing using a fusion model according to an example embodiment.

The training steps described above are repeated for a large number of training input dictionaries to sufficiently train the fusion model for inference use. When trained, as shown in FIG. 2, the fusion model can receive an input dictionary 202 (without a reference sentence) and generate, based on a defined vocabulary V, one or more natural language sentences 204 and one or more sentence templates 206 corresponding to input dictionary 202.

Figure 4:
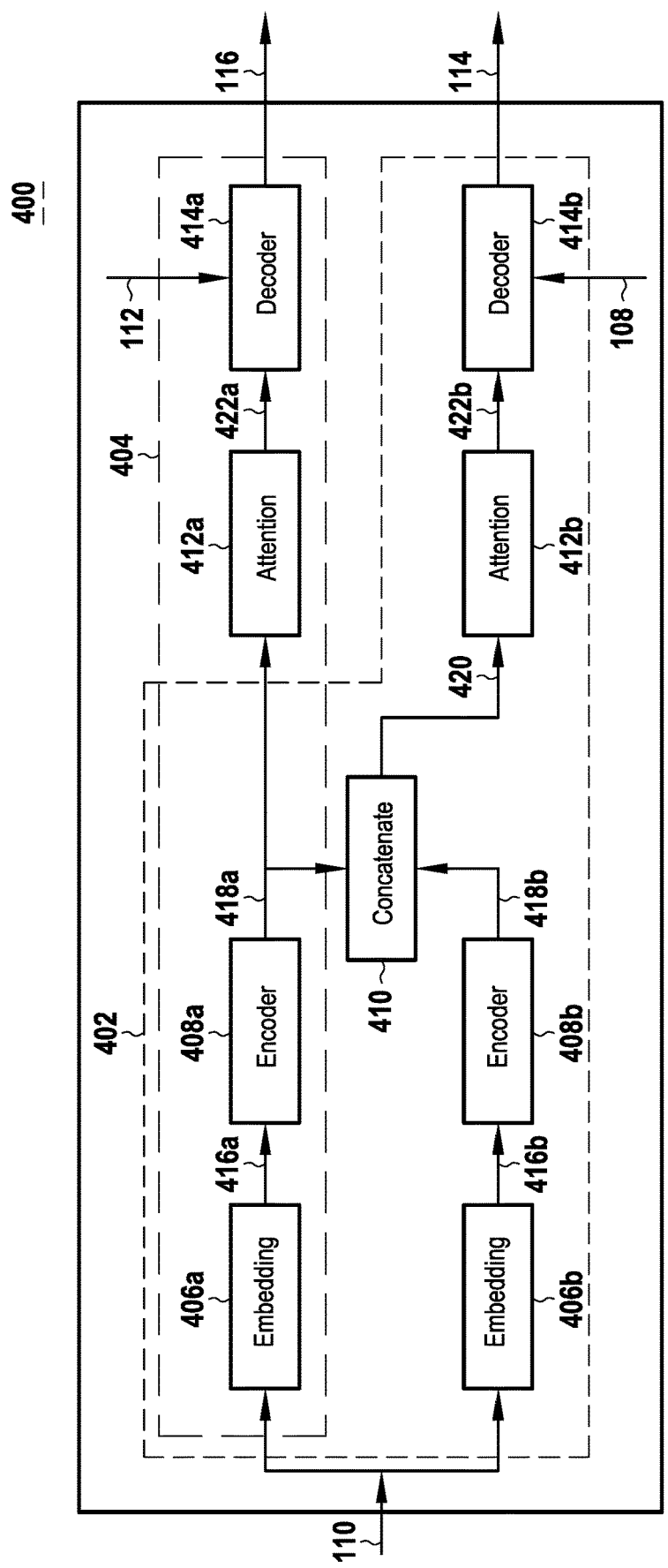
FIG. 4 illustrates an example architecture of a fusion model according to an example embodiment.

As mentioned above, in an embodiment, the fusion model may be based on an architecture that integrates a sentence generation component and a template generation component. FIG. 4 illustrates an example fusion model architecture 400 according to an example embodiment. As shown in FIG. 4, example fusion model architecture 400 integrates a sentence generation component 402 and a template generation component 404. In an embodiment, sentence generation component 402 includes embedding layers 406a and 406b, encoders 408a and 408b, concatenate block 410, attention function 412b, and decoder 414b. Template generation component 404 includes embedding layer 406a, encoder 408a, attention function 412a, and decoder 414a. Encoders 408a-b may be Bi-LSTM encoders. Decoders 414a-b may be Bi-LSTM decoders.

In embodiments, training the fusion model may include training template generation component 404 and sentence generation component 402 simultaneously or separately. In a specific embodiment, training the fusion model may include training template generation component 404; and training sentence generation component 402 using the trained templated generation component 404.

In an embodiment, as shown in FIG. 4, training the fusion model begins by receiving a training input dictionary 110 and a reference sentence 108 by the fusion model. Training input dictionary 110 is assumed to have been flattened during a pre-processing step as described above with reference to FIG. 3. For the purpose of training template generation component 404, training input dictionary 110 is delexicalized (as discussed above with reference to FIG. 3) to generate reference template 112.

In an embodiment, template generation component 404 is trained using training input dictionary 110 and reference template 112. Specifically, training input dictionary 110 is first applied to embedding layer 406a. As mentioned above, training input dictionary 110 includes a plurality of field-value pairs and is in the form of $D=\{Field_i, Value_i\}_{i=1 \ldots N}$ (where N is the number of fields in the dictionary). Embedding layer 406a maps each value of the plurality of field-value pairs of training input dictionary 110 into a corresponding (numerical) index (e.g., using a look-up table); and then maps the corresponding index of each value into a respective vector of an input sequence of vectors 416a. Embedding layer 406a provides the input sequence of vectors 416a to encoder 408a.

Encoder 408a encodes the input sequence of vectors 416a to generate a sequence of vectors 418a. In an embodiment, encoder 408a is based on a Recurrent Neural Network (RNN) model that maps the input sequence of vectors 416a into a fixed-length representation for subsequent decoding.

Attention function 412a acts on the sequence of vectors 418a to generate a modified sequence of vectors 422a, which is provided to decoder 414a for decoding. In an embodiment, the modified sequence of vectors 422a includes information that allows decoder 414a to "pay attention" to specific words of the input sequence of vectors 416a. For example, the information may help decoder 414a find matches between the specific words.

Decoder 414a decodes the modified sequence of vectors 422a using a defined vocabulary (tailored for template generation), by relying on reference template 112, to generate an output template 116.

As the encoder 408a, attention function 412a, and decoder 414a perform their respective functions described above, a back-propagation mechanism is used to update the respective weights of, and thereby train, encoder 408a, attention function 412a, and decoder 414a.

The training described above is repeated for a large number of training input dictionaries to sufficiently train the template generation component 404. Once trained, the template generation component 404 provides a model trained to generate one or more templates based on an input dictionary.

In embodiments, the trained template generation component 404 may be used to train the sentence generation component 402. Specifically, referring to FIG. 4, a training input dictionary 110 is applied simultaneously or successively to the trained template generation component 404 and to sentence generation component 402.

The trained template generation component 404 acts on training input dictionary 110 in the same manner as described above, except that in this case the parameters (weights) of the model provided by template generation component 404 remain fixed during operation.

In the sentence generation component 402, embedding layer 406b maps each value of the plurality of field-value pairs of training input dictionary 110 into a corresponding (numerical) index (e.g., using a look-up table); and then maps the corresponding index of each value into a respective vector of an input sequence of vectors 416b. Embedding layer 406b provides the input sequence of vectors 416b to encoder 408a.

Encoder 408b encodes the input sequence of vectors 416b to generate a sequence of vectors 418b. In an embodiment, encoder 408b is based on a Recurrent Neural Network (RNN) model that maps the input sequence of vectors 416b into a fixed-length representation for subsequent decoding.

In an embodiment, the sequence of vectors 418a generated by encoder 408a and the sequence of vectors 418b generated by encoder 408a are combined and provided to attention function 412b. For example, in an embodiment, the sequences of vectors 418a and 418b are input into a concatenate function 410, which generates and provides a combined sequence of vectors 420 to attention function 412b.

Attention function 412b acts on the combined sequence of vectors 420 to generate a modified sequence of vectors 422b. By acting on the combined sequence of vectors 420 (as opposed to only the sequence of vectors 418b as done conventionally), the quality of the modified sequence of vectors 422b generated by attention function 412b is improved. Specifically, in an embodiment, the sequence of vectors 418a may include hidden states of encoder 408a. The hidden states guide attention function 412b by hinting at the structure of the target natural language sentence that ought to be generated by the sentence generation component 402.

The modified sequence of vectors 422b is provided to decoder 414b for decoding. In an embodiment, the modified sequence of vectors 422b includes information that allows decoder 414b to "pay attention" to specific words of the input sequence of vectors 416b. For example, the information may help decoder 414b find matches between the non-specific words. Decoder 414b decodes the modified sequence of vectors 422b using a defined vocabulary (tailored for sentence generation), using reference sentence 108, to generate an output sentence 114.

As the encoder 408b, attention function 412b, and decoder 414b perform their respective functions described above, a back-propagation mechanism is used to update the respective weights of, and thereby train, encoder 408b, attention function 412b, and decoder 414b. The training described above is repeated for a large number of training input dictionaries to sufficiently train the sentence generation component 402. Once trained, the sentence generation component 402 provides a model trained to generate one or more sentences based on an input dictionary.

According to embodiments, once trained, the sentence generation component 402 and the template generation component 404 of the fusion model may be used jointly or independently for inference. For example, the sentence generation component 402 may be used alone to generate one or more natural language sentences based on an input dictionary. Alternatively, only sentence templates may be generated based on the input dictionary using the template generation component 404.

Figure 5:
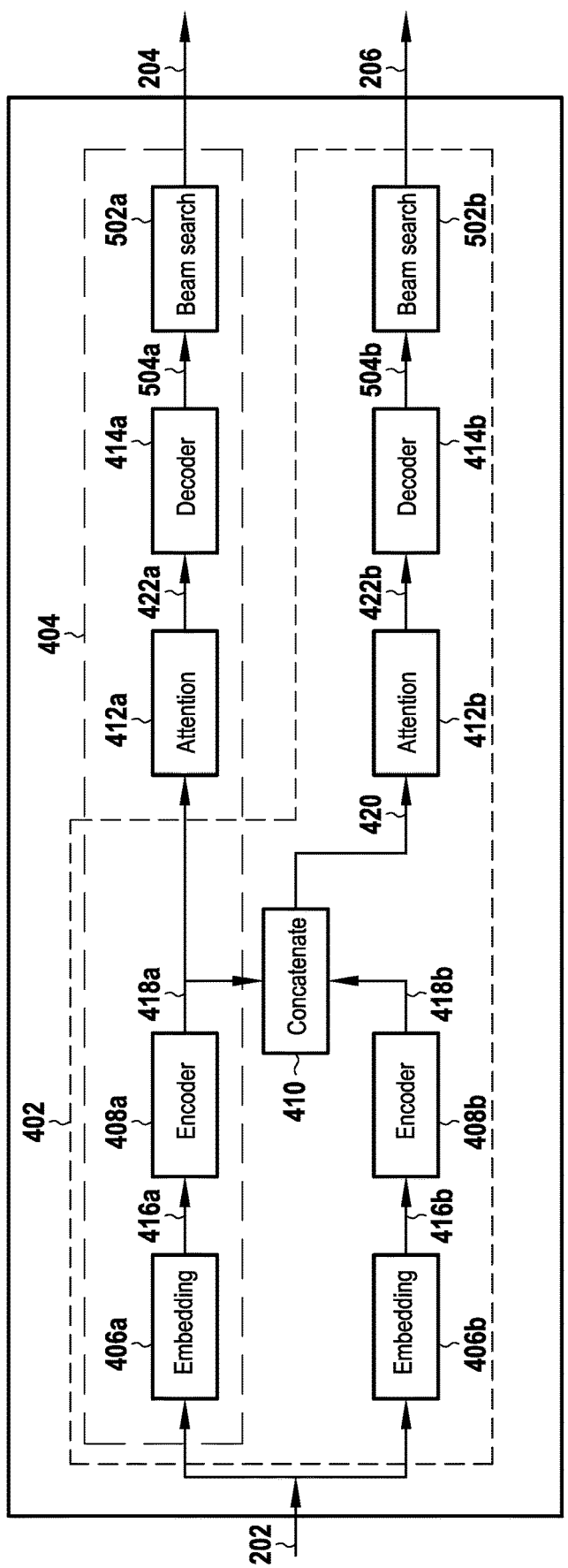
FIG. 5 illustrates an example process of inferencing using a trained fusion model according to an example embodiment.

In another embodiment, illustrated in FIG. 5, both components may be used simultaneously to generate both sentences and templates based on an input dictionary. Specifically, as shown in FIG. 5, an input dictionary 202 may be applied simultaneously to the trained sentence generation component 402 and the trained template generation component 404 of the fusion model.

Embedding layers 406a-b, encoders 408a-b, concatenate function 410, attention functions 412a-b operate in the same manner as described above with respect to training mode, except that in this case the internal weights of the different components remain fixed during operation.

Decoders 414a-b are configured to decode respectively the modified sequence of vectors 422a and 422b using respective vocabularies. Specifically, in an embodiment, decoder 414a generates an output 504a that comprises a plurality of ordered sequences of index values and associated probabilities for each ordered sequence, where each ordered sequence is a respective representation of a target sentence template. In an equivalent manner, decoder 414b generates an output 504b that comprises a plurality of ordered sequences of index values and associated probabilities for each ordered sequence, where each ordered sequence is a respective representation of a target natural language sentence.

In an embodiment, an ordered sequence of index values comprises, at least, a first index value in a first position of the ordered sequence and a second index value in a second position of the ordered sequence. The associated probabilities for the ordered sequence comprise a first probability associated with the first index value being in the first position and a second probability associated with the second index value being in the second position given that the first index value is in the first position.

In an embodiment, outputs 504a and 504b each includes all possible (template or sentence) outcomes based on input dictionary 202 and a set of probabilities for each possible outcome indicating for each word of the possible outcome the probability that the word is in the correct position within the outcome.

To select the most probable (template and sentence) outcomes, outputs 504a and 504b are provided respectively to beam search functions 502a and 502b. Beam search function 502a is configured to select a predetermined number of ordered sequences of index values based on the plurality of ordered sequences in output 504a, where the predetermined number of ordered sequences represent the most probable ordered sequences among the plurality of ordered sequences in output 504a. Similarly, beam search function 502b is configured to select a predetermined number of ordered sequences of index values based on the plurality of ordered sequences in output 504b, where the predetermined number of ordered sequences represent the most probable ordered sequences among the plurality of ordered sequences in output 504b.

In an embodiment, beam search functions 502a and 502b use a beam search algorithm as described in Graves et al. ("Speech recognition with deep recurrent neural networks. arXiv:1303.5778v1) which explores a graph by expanding the most promising node in a limited set. Specifically, the goal is to find the candidate sequence Y that maximizes a given scoring function s(Y, I), where I is the input to the model. In an embodiment, the scoring function is given by:

$$s(Y,I) = \log(P(Y|I))$$

In an embodiment, to favor sentences that fully cover the details provided in the input dictionary, the scoring function s(Y, I) is adjusted to introduce length and coverage penalty terms as described in Wu et al. ("Google's Neural Machine Translation System: Bridging the Gap between Human and Machine Translation. arXiv:1609.08144). The length penalty controls the length of the generated sentence/template favoring longer sequences to be generated. The coverage penalty favors sentences/templates that cover more words of the input dictionary.

In an embodiment, using length and coverage penalties, the scoring function is provided by:

$$s(Y, I) = \frac{\log(P(Y \mid I))}{l_p(Y)} + cp(I, Y)$$

where $$l_p(y) = \frac{(5 + |y|)^\alpha}{(5 + 1)^\alpha}$$

and $$cp(x, y) = \beta \cdot \sum_{i=1}^{|x|} \log\left(\min\left(\sum_{t=1}^{|y|} a_i^t, 1.0\right)\right)$$

and where $a_i^j$ represents the weight of the attention associated with the j-th target word $y_j$ and the i-th source word $x_i$, $\alpha$ is a tunable parameter controlling the strength of the length penalty (the higher this parameter is, the more likely to have shorter sentences), and $\beta$ is a tunable parameter controlling the strength of the coverage penalty.

From the predetermined number of sequences of index values that it selects, beam search function 502b may generate a predetermined number of candidate sentences 206, each corresponding to the target natural language sentence. Similarly, beam search function 502a may generate a predetermined number of candidate sentence templates 204, each corresponding to the target sentence template. The predetermined number of candidate sentences 206 and the predetermined number of candidate sentence templates 204 may be equal in number or different. For the purpose of simplification, it is assumed hereinafter that B candidate sentences and B candidate sentence templates are generated.

The target natural language sentence may be selected based on a ranking based at least on the candidate sentences 206.

Figure 6:
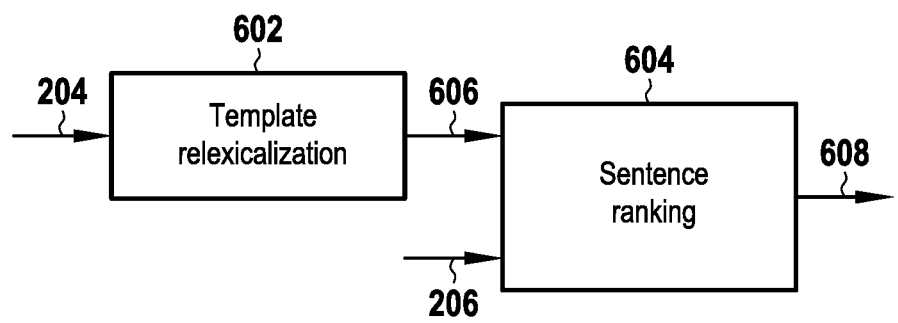
FIG. 6 illustrates an example process of target natural language selection according to an example embodiment.

In an embodiment, the ranking is based on both the candidate sentences 206 and candidate sentences generated by relexicalizing the sentence templates 204. Specifically, as shown in FIG. 6, the sentence templates 204 may be provided to a template relexicalization function 602 that generates a second set of candidate sentences 606 using the input dictionary. The template relexicalization function 602 uses a lexicalization process (the inverse template function) that replaces every Field in the template with its corresponding Value from the input dictionary. A sentence ranking function 604 acts on both the candidate sentences 206 and the second set of candidate sentences 606 to select a sentence 608 as the target natural language sentence.

In an embodiment, the target natural language sentence selection uses a ranking function based on an F-1 score calculation that measures how faithful a candidate sentence is to the input dictionary. In an embodiment, the selected sentence maximizes a first number corresponding to the number of values in the candidate sentence that appear in the input dictionary (Recall) and minimizes a second number corresponding to the number of values in the candidate sentence that do not appear in the input dictionary (Precision).

In an embodiment, the selected sentence (O) is the candidate sentence that maximizes the function:

$$O(D) = \mathrm{Argmax}_{c \in C} F_1(D, c)$$

where $$F_1(D, C_i) = \frac{2 \times P(D, C_i) \times R(D, C_i)}{P(D, C_i) + R(D, C_i)}$$

represents an F-1 score metric based on a precision (P) score and a recall (R) score computed based on a Value-by-Value comparison between the candidate sentence and the input dictionary.

Figure 7:
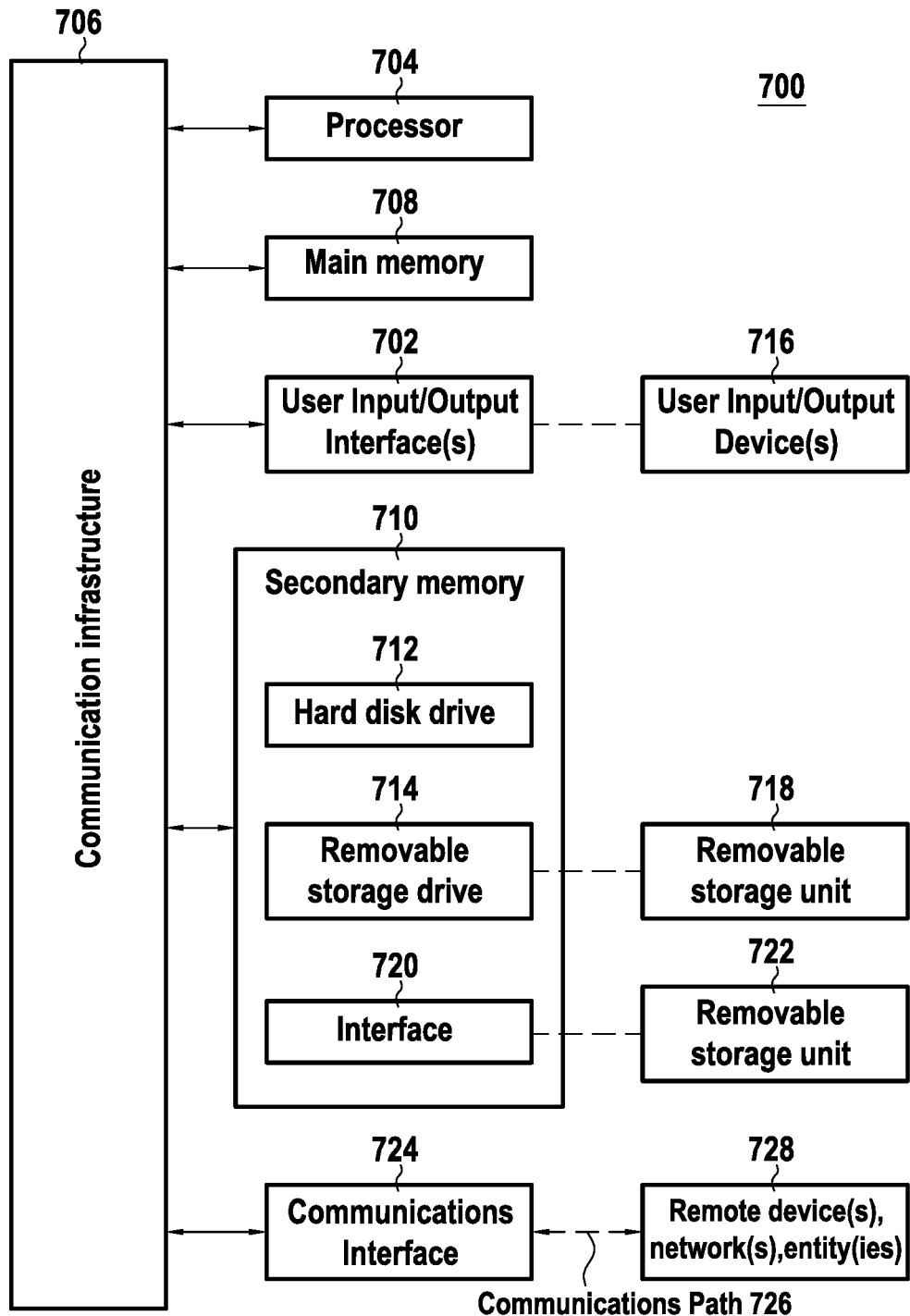
FIG. 7 illustrates an example computer system in which embodiments may be implemented.

FIG. 7 illustrates an example computer system 700 in which embodiments may be implemented. Computer system 700 includes one or more processors (also called central processing units, or CPUs), such as a processor 704. Processor 704 is connected to a communication infrastructure or bus 706. Processor 704 may be a graphics processing unit (GPU).

Computer system 700 also includes user input/output device(s) 716, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data that when executed by the one or more processors 704 perform the above described embodiments, including the processes described in FIGS. 1-6.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, a tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an example embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communications or network interface 724. Communications interface 724 enables computer system 700 to communicate and interact with any combination of remote devices, remote networks, remote entities, etc. (individually and collectively referenced by reference number 728). For example, communications interface 724 may allow computer system 700 to communicate with remote devices 728 over a communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having computer instructions (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such computer instructions, when executed by one or more data processing devices (such as computer system 700), cause such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 7.

Example Performance Results

In the following, example performance results obtained using an example fusion model according to an embodiment are presented. In this example, the fusion model was trained to automatically generate natural language sentence describing an investment rule represented by a set of {Field:Value} pairs summarizing its content. An example of the input (input dictionary) and output (target natural language sentence) of the fusion model according to this example are shown in Table 1 below. An objective in this example was to have the target natural language sentence cover all the content provided by a given input while maintaining correct grammaticality and semantic meaning of the sentence.

TABLE 1

| Input | | | |
|---|---|---|---|
| Field | Type | sub-field | Content |
| adverb_limit | string | — | |
| denominator | string | — | DENOMINATOR_DEFAULT |
| function | string | — | exposure |
| group_by | string | — | |
| limit | list of dictionaries | limit_min limit_max type | 33.33333 66.666666 1 |
| selection_list | list of dictionaries | caps_type country currency market_type position_type economic_sector selection | short, long |
| type | string | — | LIMIT |
| unselection_list | list of dictionaries | country currency selection | |
| Output | | | |

Synthetic short positions represent approximately ⅓ (one third) and long positions represent approximately ⅔ (two thirds) of the Sub-Fund's overall exposure but this split may vary from time to time.

To build a training data set for the example fusion model, a binary classification system was used to classify sentences extracted from financial prospectuses to detect those that correspond to investment rules. Then, a rule-based semantic frame extraction system is used to build for each rule a formal meaning representation table which represents the rule as {Field:Value} structured data. As shown in Table 1 above, the fields include financial instruments, limits, countries, rule type, etc. The values of the fields are extracted from the investment rule. For instance, in Table 1, the value "exposure" corresponds to the field "function".

Performance of the example fusion model was compared against two traditional approaches—a template-based approach and a sequence-to-sequence with attention approach. Table 2 summarizes the results of a blind test set of 600 investment rule descriptions and their formal meaning representations, for both English and French language. Four evaluation metrics were used to assess the performance of the different approaches: BLEU (a score originally used in machine translation for comparing a candidate machine translation of text to one or more reference translations); ROUGE-L (a metric used for text summarization evaluation which computes the ratio between the length of the longest common subsequence between the generated sentence and the reference and the length of the reference); F-1 (a coverage and precision metric that compares the values of the output sentence with the values of the input dictionary); and Fluency (a metric that estimates the grammatical coherence of the generated sentence and its linguistic fluency. The grammaticality of the sentence is measured in terms of its perplexity, where the lower the perplexity is the better the sentence is. In the below, the Fluency scores are normalized by the mean perplexity of the training set—hence, a score lower than 100 indicates that the sentence is grammatically coherent, i.e., the perplexity of the sentence is lower than the average perplexity of the training set).

TABLE 2

| Metrics | Template-based Baseline | Bi-LSTM Attention | Fusion model |
|---|---|---|---|
| English | | | |
| BLEU | 30.05 | 42.24 | 48.06* |
| ROUGE-L | 36.74 | 57.47 | 61.43* |
| $F_1$ | 88.28 | 87.43 | 96.50* |
| Fluency | 06.07* | 27.90 | 38.05 |
| French | | | |
| BLEU | 25.01 | 35.37 | 48.06* |
| ROUGE-L | 39.26 | 55.69 | 68.26* |
| $F_1$ | 94.56 | 89.01 | 95.41* |
| Fluency | 08.64* | 09.20 | 10.18 |

As shown in Table 2 above, the example fusion model outperforms both traditional approaches under the F-1, BLEU, and ROUGE-L metrics for both English and French. This means that sentences generated using the fusion model are lexically closer to their corresponding references than those generated using the two traditional approaches.

For all the models, the Fluency score is lower than 100, which means that the average perplexity of the generated sentence is lower than the perplexity of the training sentences (on which the language model was trained). The example fusion model has relatively high grammatical score, which means that the model generates sentences that are quite different from those appearing in the training set.

Additional Variants

Although the present disclosure has been described above with reference to certain specific embodiments, it will be understood that the disclosure is not limited by the particularities of the specific embodiments. Numerous variations, modifications and developments may be made in the above-described embodiments within the scope of the appended claims.

The invention claimed is:

1. A method for generating natural language text from structured data using a fusion model, comprising:
receiving an input dictionary including a plurality of field-value pairs;
generating, by a first encoder, a first sequence of vectors based on the input dictionary;
receiving a second sequence of vectors, generated by a second encoder based on the input dictionary;
generating, by a first attention function, a modified first sequence of vectors based on the first sequence of vectors and the second sequence of vectors;
decoding, by a first decoder, the modified first sequence of vectors based on a vocabulary to generate a first plurality of ordered sequences of index values and associated probabilities for each ordered sequence, each ordered sequence being a respective representation of a target natural language sentence;
selecting a first predetermined number of ordered sequences of index values based on the first plurality of ordered sequences, the first predetermined number of ordered sequences representing the most probable ordered sequences among the first plurality of ordered sequences;
generating a first predetermined number of candidate sentences, each corresponding to the target natural language sentence, respectively from the first predetermined number of ordered sequences; and
selecting a sentence as the target natural language sentence, based on a ranking based at least on the first predetermined number of candidate sentences.

2. The method of claim 1, wherein the input dictionary is a flattened input dictionary.

3. The method of claim 1, comprising:
mapping each value of the plurality of field-value pairs of the input dictionary into a corresponding index;
mapping the corresponding index of each value into a respective vector of an input sequence of vectors; and
providing the input sequence of vectors to the first encoder to generate the first sequence of vectors.

4. The method of claim 1, wherein the first encoder and the second encoder are Bi-LSTM encoders.

5. The method of claim 1, wherein the second sequence of vectors include hidden states of the second encoder.

6. The method of claim 1, wherein an ordered sequence of index values comprises a first index value in a first position of the ordered sequence and a second index value in a second position of the ordered sequence, and wherein the associated probabilities for the ordered sequence comprise a first probability associated with the first index value being in the first position and a second probability associated with the second index value being in the second position given that the first index value is in the first position.

7. The method of claim 1, wherein the selected sentence maximizes a first number corresponding to the number of values in the candidate sentence that appear in the input dictionary and minimizes a second number corresponding to the number of values in the candidate sentence that do not appear in the input dictionary.

8. The method of claim 1, comprising:
generating, by a second attention function, a modified second sequence of vectors based on the second sequence of vectors;
decoding, by a second decoder, the modified second sequence of vectors based on the vocabulary to generate a second plurality of ordered sequences of index values and associated probabilities for each ordered sequence, each ordered sequence being a respective representation of a target sentence template;
selecting a second predetermined number of ordered sequences of index values based on the second plurality of ordered sequences, the second predetermined number of ordered sequences representing the most probable ordered sequences among the second plurality of ordered sequences; and
generating a predetermined number of candidate sentence templates, each corresponding to the target sentence template, respectively from the second predetermined number of ordered sequences.

9. The method of claim 8, wherein the first decoder and the second decoder are Bi-LSTM decoders.

10. The method of claim 8, comprising:
relexicalizing the predetermined number of candidate sentence templates using the input dictionary to generate a second predetermined number of candidate sentences, each corresponding to the target natural language sentence.

11. The method of claim 10, comprising:
ranking a set of sentences including the first predetermined number of candidate sentences and the second predetermined number of candidate sentences; and selecting the sentence as the target natural language sentence based on the ranking of the set of sentences.

12. The method of claim 8, wherein the first encoder, the first attention function, and the first decoder form part of a sentence generation component of the fusion model, and wherein the second encoder, the second attention function, and the second decoder form part of a template generation component of the fusion model.

13. The method of claim 12, comprising:
training the template generation component; and
training the sentence generation component using the trained templated generation component.

14. The method of claim 13, wherein training the template generation component comprises:
flattening a training input dictionary to generate a flattened input dictionary;
delexicalizing a reference sentence corresponding to the training input dictionary to generate a reference template; and
training the template generation component using the flattened training input dictionary and the reference template.

15. The method of claim 13, wherein training the sentence generation component comprising:
flattening a training input dictionary to generate a flattened input dictionary;
applying the flattened input dictionary and a corresponding reference sentence to the sentence generation component; and
feeding hidden states generated by the second encoder based on the flattened input dictionary to the first attention function.

16. A non-transitory computer readable medium having computer instructions stored thereon, the computer instructions when executed by a processor cause the processor to perform a method for generating natural language text from structured data using a fusion model:
receiving an input dictionary including a plurality of field-value pairs;
generating, by a first encoder, a first sequence of vectors based on the input dictionary;
receiving a second sequence of vectors, generated by a second encoder based on the input dictionary;
generating, by a first attention function, a modified first sequence of vectors based on the first sequence of vectors and the second sequence of vectors;
decoding, by a first decoder, the modified first sequence of vectors based on a vocabulary to generate a first plurality of ordered sequences of index values and associated probabilities for each ordered sequence, each ordered sequence being a respective representation of a target natural language sentence;
selecting a first predetermined number of ordered sequences of index values based on the first plurality of ordered sequences, the first predetermined number of ordered sequences representing the most probable ordered sequences among the first plurality of ordered sequences;
generating a first predetermined number of candidate sentences, each corresponding to the target natural language sentence, respectively from the first predetermined number of ordered sequences; and
selecting a sentence as the target natural language sentence, based on a ranking based at least on the first predetermined number of candidate sentences.

17. The non-transitory computer-readable medium of claim 16, wherein the second sequence of vectors include hidden states of the second encoder.

18. The non-transitory computer-readable medium of claim 16, wherein the method comprises:
generating, by a second attention function, a modified second sequence of vectors based on the second sequence of vectors;
decoding, by a second decoder, the modified second sequence of vectors based on the vocabulary to generate a second plurality of ordered sequences of index values and associated probabilities for each ordered sequence, each ordered sequence being a respective representation of a target sentence template;
selecting a second predetermined number of ordered sequences of index values based on the second plurality of ordered sequences, the second predetermined number of ordered sequences representing the most probable ordered sequences among the second plurality of ordered sequences; and
generating a predetermined number of candidate sentence templates, each corresponding to the target sentence template, respectively from the second predetermined number of ordered sequences.

19. The non-transitory computer-readable medium of claim 18, where the method comprises:
relexicalizing the predetermined number of candidate sentence templates using the input dictionary to generate a second predetermined number of candidate sentences, each corresponding to the target natural language sentence.

20. The non-transitory computer-readable medium of claim 19, wherein the method comprises:
ranking a set of sentences including the first predetermined number of candidate sentences and the second predetermined number of sentences; and
selecting the sentence as the target natural language sentence based on the ranking of the set of sentences.

* * * * *